(12) United States Patent
Pittman et al.

(10) Patent No.: US 12,189,275 B2
(45) Date of Patent: Jan. 7, 2025

(54) PHONE RIG FOR MULTIPLE CAMERAS

(71) Applicants: Matt Pittman, Coeur d'Alene, ID (US); Alexander Simon, Wellesley, MA (US)

(72) Inventors: Matt Pittman, Coeur d'Alene, ID (US); Alexander Simon, Wellesley, MA (US)

( * ) Notice: Subject to any disclaimer, the term of this patent is extended or adjusted under 35 U.S.C. 154(b) by 130 days.

(21) Appl. No.: 17/860,540

(22) Filed: Jul. 8, 2022

(65) Prior Publication Data

US 2024/0012316 A1    Jan. 11, 2024

(51) Int. Cl.
*G03B 17/56* (2021.01)
*A45C 11/00* (2006.01)
*H04B 1/3888* (2015.01)
*H04M 1/02* (2006.01)
*H04M 1/04* (2006.01)

(52) U.S. Cl.
CPC ............ *G03B 17/561* (2013.01); *A45C 11/00* (2013.01); *G03B 17/566* (2013.01); *H04B 1/3888* (2013.01); *H04M 1/0264* (2013.01); *H04M 1/04* (2013.01); *A45C 2011/002* (2013.01)

(58) Field of Classification Search
None
See application file for complete search history.

(56) References Cited

U.S. PATENT DOCUMENTS

| | | | | |
|---|---|---|---|---|
| 11,073,743 B2 * | 7/2021 | Deavis | ............... | H04N 23/55 |
| 11,297,917 B1 * | 4/2022 | Malach | ............... | H04B 1/3888 |
| 11,671,526 B2 * | 6/2023 | Pahl | ............... | H04B 1/3888 |
| | | | | 455/575.1 |
| 2015/0042877 A1 * | 2/2015 | O'Neill | ............... | G02B 7/14 |
| | | | | 348/376 |
| 2019/0129469 A1 * | 5/2019 | Bacallao | ............... | H02J 7/0044 |

* cited by examiner

*Primary Examiner* — Rodney E Fuller
(74) *Attorney, Agent, or Firm* — Edwin Tarver

(57) ABSTRACT

A phone rig is provided for multiple cameras for making multiple point of view recordings by a first electronic apparatus having a first screen, a second electronic apparatus having a second screen and a first camera, and a third electronic apparatus having a third screen and a second camera. The phone rig includes a first body for holding the first electronic apparatus in a screen facing orientation, a second body for holding the second electronic apparatus in a camera facing orientation, and a third body for holding the third electronic apparatus. A wedge member is provided for installation between the first body and the second body, such that the first screen of the first electronic apparatus is angled, relative to the first camera of the second electronic apparatus and the second camera of the third electronic apparatus.

20 Claims, 5 Drawing Sheets

PHONE RIG FOR MULTIPLE CAMERAS

BACKGROUND

Field of the Invention

The present invention generally relates to camera rigs. More specifically, the present invention relates to a camera rig for holding multiple cameras.

Related Art

Camera rigs are known in the art. Such rigs typically provide an anchorage for a still or motion picture camera, to hold it in a static position relative to a surface or other object. Current camera rigs known in the art are typically engineered for holding. A conventionally shaped camera (i.e., either an SLR-style still camera or motion picture camera, such as a film or video camera).

Holders and cases for hand-held personal electronic devices such as so-called "smart phones" are also known in the art. Such holders and cases are generally engineered to protect the exterior of personal electronic devices from external damage, in addition to providing shock absorbing properties for protecting the devices' sensitive internal components when dropped or otherwise subject to physical shock.

Modern personal electronic devices have been developed sufficiently technological cameras to produce broadcast quality still and moving images. Thus, such personal electronic devices have come into use as production cameras, with the added advantage of small size and low cost. Thus, a need has emerged for personal electronic device holders that allow persons to hold them or set them up in a configuration for professional filming.

Due to the small size of personal electronic devices, and the digital nature of the still and motion photography they enable, it is possible to use two or more devices to film the same scene from different perspectives. In some instances, doing so requires that the two or more personal electronic devices be set up in a static relationship to one another, which permits editing footage from multiple points of view, virtually at the same time, among other uses.

Hence, what is needed is a personal electronic device holder that provides anchorage for multiple personal electronic devices, preferably in the same camera rig, without the limitations of existing techniques.

SUMMARY

In a first implementation, a phone rig for multiple cameras is provided for making multiple point of view image and moving image recordings. The recordings are made by at least a first electronic apparatus having a first screen, and a second electronic apparatus having a second screen and a first camera. The phone rig includes a first body configured for holding the first electronic apparatus therein, in a screen facing orientation. A second body is provided and configured for holding the second electronic apparatus therein in a camera facing orientation.

The first body is configured for fixation to the second body in an offset configuration, such that a first screen of the first electronic apparatus and a first camera of the second electronic apparatus are both visible from a viewing direction. The second body is configured for supporting a first moment lens installed over the first camera of the second electronic apparatus. The phone rig may also include a lid for covering a screen portion of the second electronic apparatus, thus avoiding casting screen light in the direction of the first camera.

The phone rig also includes a wedge member. The wedge member is preferably configured for installation between the first body and the second body, such that the first screen of the first electronic apparatus is angled, relative to the first camera of the second electronic apparatus. The wedge member may provide any predetermined angle between the first body and the second body. The phone rig also includes a first moment mount configured for fixing to the second body and the first moment lens.

The first body preferably includes a first bottom anchor for holding the first electronic apparatus, and a first top clamp for fixing the first electronic apparatus in the first body. Likewise, the second body includes a second bottom anchor for holding the second electronic apparatus, and a second top clamp for fixing the second electronic apparatus in the second body. Preferably the first body and the second body each have cut-outs for accessing controls on the first electronic apparatus and the second electronic apparatus, respectively.

In a second implementation, the phone rig includes a third body. The third body configured for holding a third electronic apparatus having a third screen and a second camera. In this implementation, the phone rig also includes a wedge member, wherein the wedge member is configured for installation between the first body and the second body, such that the first screen of the first electronic apparatus is angled, relative to the first camera of the second electronic apparatus.

The third body is configured for supporting a second moment lens installed over the second camera of the third electronic apparatus. A second moment mount is provided for holding the second moment lens in place over the second camera of the third electronic apparatus. The third body also includes a third bottom anchor for holding the third electronic apparatus, and a third top clamp for fixing the third electronic apparatus in the third body.

In the second implementation, the phone rig also includes a hinge between the second body and the third body. The hinge is preferably configured to be along a side of the second body and a side of the third body, such that the second screen of the second electronic apparatus and the third screen of the third electronic apparatus are side-by-side when opened along the hinge. A hinge lock is also provided for locking the third body against the second body.

In another implementation, the phone rig may be described as a phone rig for multiple cameras for making multiple point of view image and moving image recordings by a first electronic apparatus having a first screen and a second electronic apparatus having a second screen and a first camera, and a third electronic apparatus having a third screen and a second camera. The phone rig includes a first body configured for holding the first electronic apparatus therein, in a screen facing orientation, a second body configured for holding the second electronic apparatus therein, in a camera facing orientation, and a third body configured for holding the third electronic apparatus therein.

The first body is configured for fixation to the second body in an offset configuration, such that a first screen of the first electronic apparatus and a first camera of the second electronic apparatus are both visible from a viewing direction. The third body is configured for fixation to the second body, such that second camera of the third electronic apparatus faces away from the viewing direction. The second body is configured for supporting a first moment lens installed over the first camera of the second electronic apparatus. The third body is configured for supporting a second moment lens installed over the second camera of the third electronic apparatus. The phone rig also includes a wedge member configured for installation between the first body and the second body, such that the first screen of the first electronic apparatus is angled, relative to the first camera of the second electronic apparatus and the second camera of the third electronic apparatus.

DESCRIPTION

The following description is presented to enable any person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown but is to be accorded the widest scope consistent with the principles and features disclosed herein.

Figure 1:
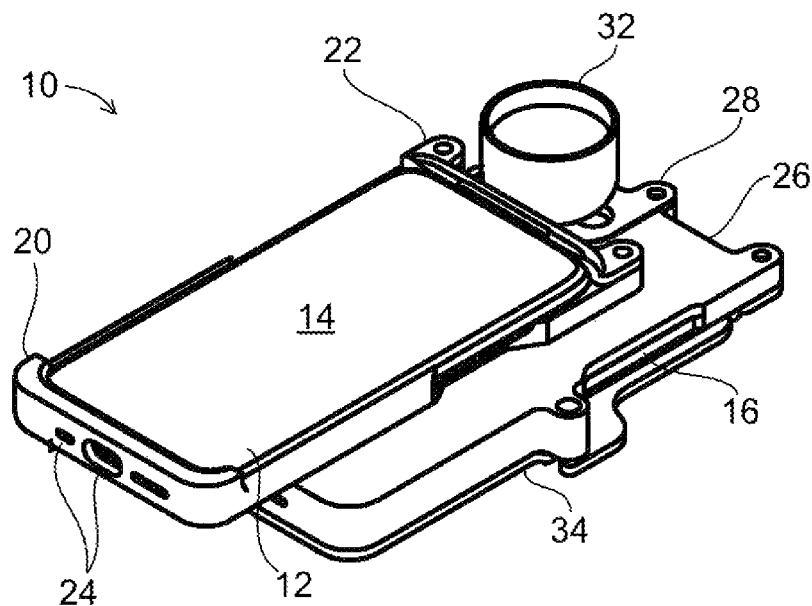
FIG. 1 illustrates a first embodiment phone rig for multiple cameras.

Referring to FIG. 1, a first implementation phone rig 10 for multiple cameras is shown in a flat configuration. The first configuration phone rig 10 is adapted for holding a first electronic apparatus 12 having at least a screen 14, and a second electronic apparatus 16 having at least a camera (not shown). Any electronic apparatus (e.g., 12, 16, etc.) discussed herein may be a "smart phone" type cell phone, or any other similar type of apparatus having one or more cameras, one or more screens which may be interactive, and preferably including processing, memory, and transmission features common to modern computing equipment, including hand-held cellular phones.

The first electronic apparatus 12 is preferably held in a first body 20 using a top clamp 22. The top clamp 22 in one implementation fastens to the first body 20 using screws (not shown). The first body 20 is preferably configured to permit access to controls on the first electronic apparatus, including side controls (not shown), and access to the screen 14 of the first electronic apparatus 12. Also preferably included are a series of portals 24 for data transfer, charging, speaker, and microphone features of the first electronic apparatus 12.

The first body 20 preferably fastens to a second body 26, which holds the second electronic apparatus 16. The second electronic apparatus 16 is preferably held in the second body 26 also by using a top clamp 22. The first body 20 may secure to the second body 26 through a series of screw holes 18 (FIG. 6) in the back of the first body 20. The second body 26 is also configured to permit access to control on the second electronic apparatus, including side controls (not shown), and a series of portals 24 for changing, speaker, and microphone features of the second electronic apparatus 16. A first moment mount 28 is configured to cover a camera portal 30 (FIG. 8) on the second body 26. In one implementation, the first moment mount 28 is proximal or adjacent to the top clamp 22.

A first moment lens 32 affixes to the moment mount 28 and is positioned such that the camera (not shown) of the second body 26 is aligned with the first moment lens 32. A lid 34 is provided for fixing to the second body 26 and covering the screen of the second electronic apparatus 16. The lid 34 is preferably a planar sheet, and in one implementation, the lid 34 may include a series of sliding tabs 36, enabling the lid 34 to conveniently slide on and off the second body 26.

Figure 2:
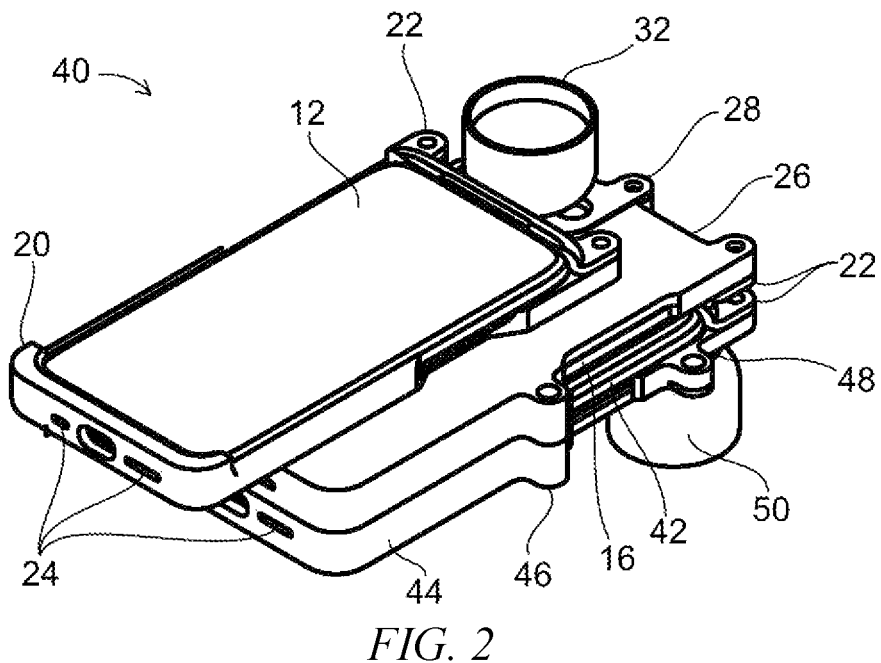
FIG. 2 illustrates a second embodiment phone rig for multiple cameras.

Referring to FIG. 2, a second implementation phone rig 40 for multiple cameras is shown in a flat configuration. The second configuration phone rig 40 is adapted for holding the first electronic apparatus 12, the second electronic apparatus 16, and a third electronic apparatus 42 having at least a camera (not shown). The third electronic apparatus 42 may be a "smart phone" type cell phone, as discussed above, or any other similar type of apparatus having one or more cameras, one or more screens which may be interactive, and preferably including processing, memory, and transmission features common to modern computing equipment, including handheld cellular phones.

The second implementation phone rig 40 includes the first body 20, which holds the first electronic apparatus 12 using top clamp 22, and the second body 26 which holds the second electronic apparatus 16. The first moment mount 28 and first moment lens 32 are also shown affixed to the second body 26. A third body 44 containing the third electronic apparatus 42 is shown affixed to the second body 26 opposite the first body 20. The third body 44 is preferably affixed to the second body using a hinge lock 46, thus preventing the third body 44 from rotating relative to the second body 26, or, if unlocked, to access the second electronic apparatus 16 and the third electronic apparatus 42.

Figure 9:
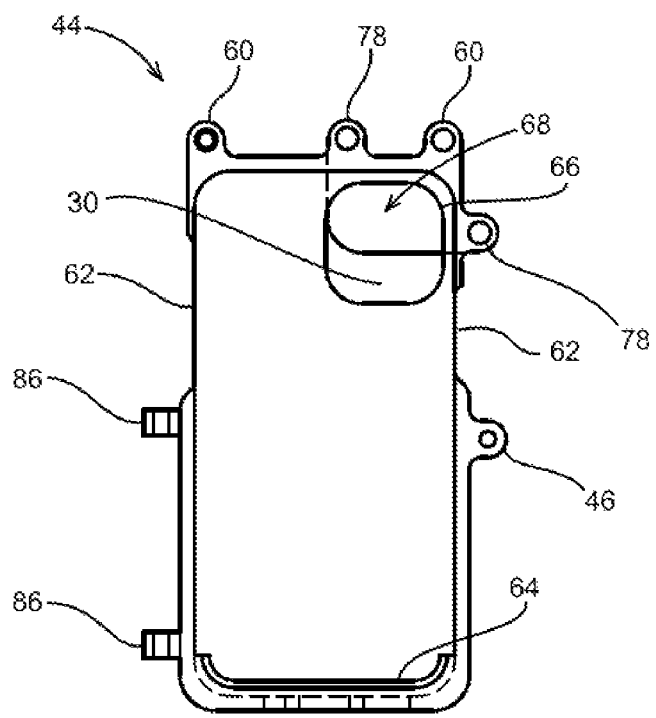
FIG. 9 illustrates a third body of the second embodiment phone rig for multiple cameras.

The third body 44 also includes a camera portal 30 (FIG. 9). A second moment mount 48 and a second moment lens 50 are configured to be affixed to the third body 44 at its camera portal 30. Like the first body 20 and the second body 26, the third body 44 preferably includes a top clamp 22 for holding the third electronic apparatus 42 in place. In one implementation, the top clamp 22 of the second body 26 is complimentary to and rests against the top clamp 22 of the third body 44, thereby providing resistance and assisting with maintaining the second body 26 fixed in place relative to the third body 44 under pressure, when the second body 26 is fixed to the third body 44 using the hinge lock 46. In one implementation, the lid 34 may be installed between the second electronic apparatus 16 and the third electronic apparatus 42, although this is not necessary.

Figure 3:
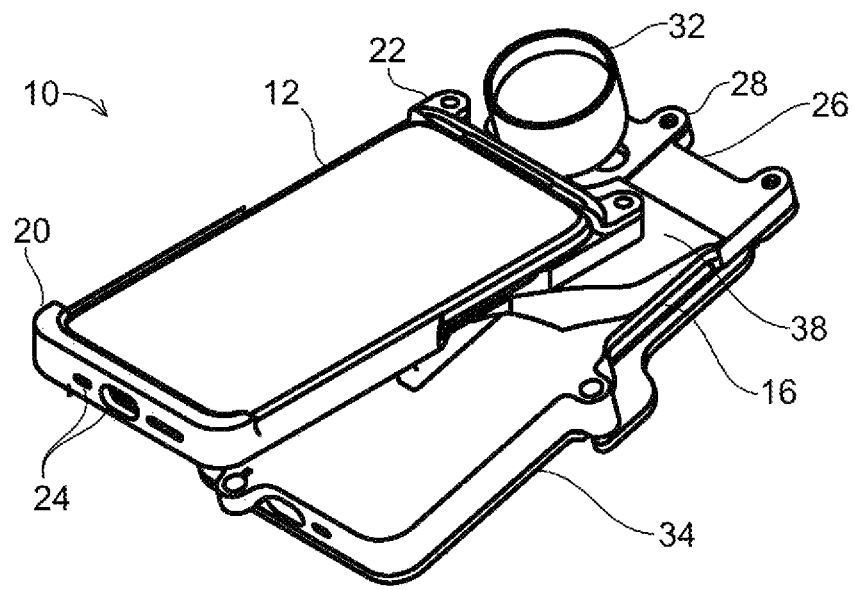
FIG. 3 illustrates the first embodiment phone rig for multiple cameras including a wedge spacer.
Figure 4:
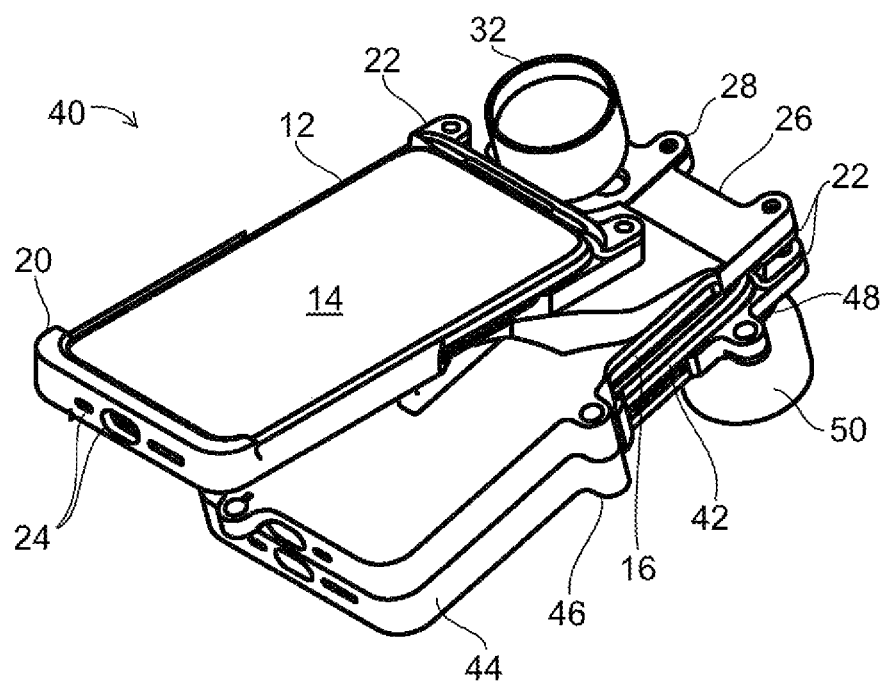
FIG. 4 illustrates the second embodiment phone rig for multiple cameras including a wedge spacer.

Referring to FIGS. 3 and 4, the first implementation phone rig 10 (FIG. 3) and the second implementation phone rig 40 (FIG. 4) are shown with a wedge mount 38 installed between the first body 20 and the second body 26. The wedge mount 38 provides an angled surface between the first body 20 a 20nd the second body 26, such that the screen 14 of the first electronic apparatus 12 in the first body 20 is angled relative to the first moment lens 32 of the second electronic apparatus 16 affixed to the first moment lens mount 28 of the second body 26. The wedge mount 38 may be configured to have any preferred predetermined angle, according to preference. To avoid impinging on the first moment lens 32, the wedge mount 38 is preferably configured such that it extends around the first moment mount 28 where the wedge mount 38 contacts the second body 26. The wedge mount 38, may include a loop portion 52 for retaining the first implementation phone rig 10 or the second implementation phone rig 40 on a user's index finger.

Figure 5:
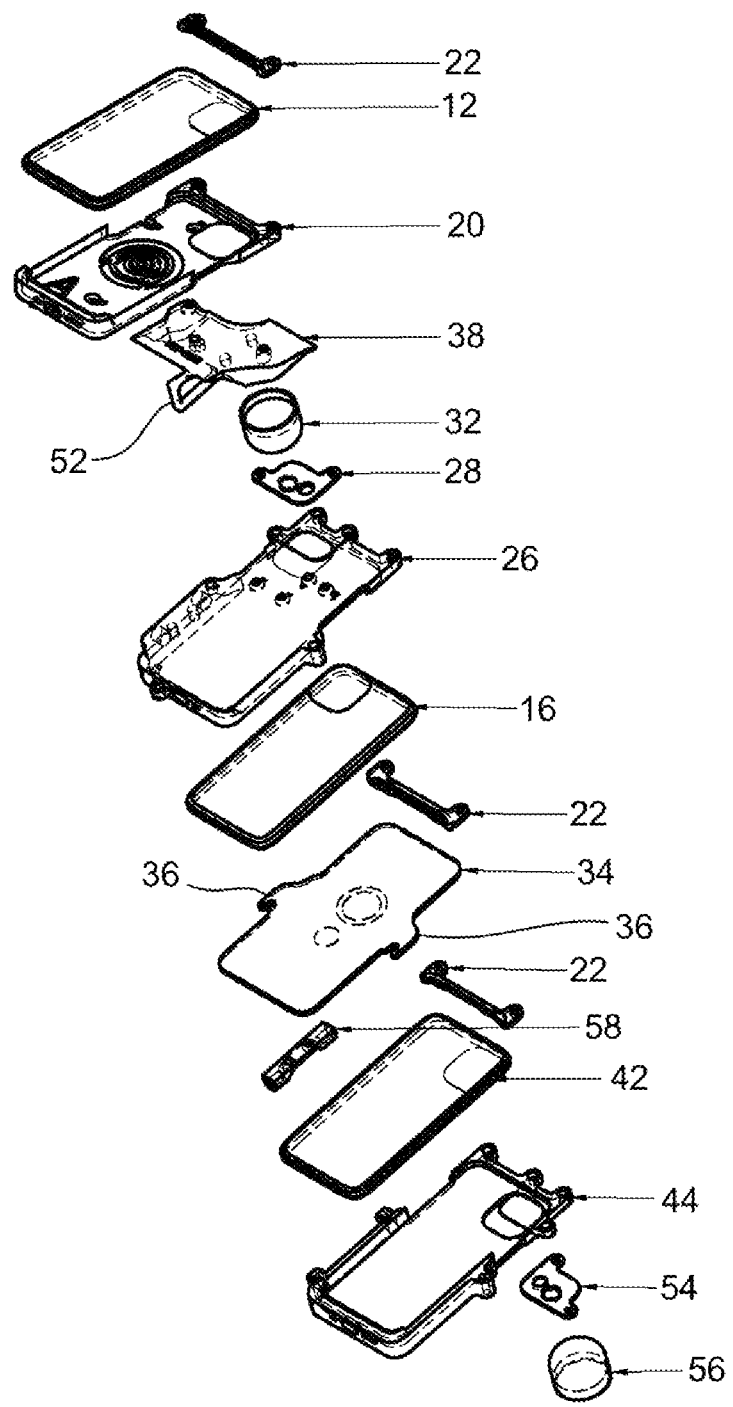
FIG. 5 illustrates an exploded view of the second embodiment phone rig for multiple cameras.

FIG. 5 illustrates an exploded view of the second implementation phone rig 40, including the wedge mount 38. As shown, the first electronic apparatus 12 seats in the first body 20 and is retained at the bottom of the first electronic apparatus 12 by the first body 20 and retained at the top of the first electronic apparatus 12 by a top clamp 22. Prior to installing the first electronic apparatus 12 in the first body 20, the wedge mount 38 may be affixed to the second body 26, and the first body may be affixed to the wedge mount 38 using screw holes 18 (FIG. 6) in the first body 20.

The first body 20, first electronic apparatus 12 and wedge mount 38 are affixed to the second body 26 in a position such that the first moment mount 28 and first moment lens 32 can be affixed at the camera portal 30 of the second body 26. The second electronic apparatus 16 is installed in the second body 26 and held in place with a top clamp 22 in a manner similar to the first body 20 and first electronic apparatus 12. The lid 34 may or may not be included on the second body 26. The third electronic apparatus 42 seats in the third body 44, preferably affixed with a top clamp 22, and a third moment mount 54 and a third moment lens 56 are affixed to the third body 44.

A hinge 58 is provided for affixing to the second body 26 and the third body 44. The hinge allows the third body 44 to rotate relative to the second body 26, thereby allowing the third electronic apparatus 42 to rotate relative to the second electronic apparatus 16. This allows the screens of the third electronic apparatus 42 and the second electronic apparatus 16 to be easily viewed. To prevent the third body 44 from swinging freely relative to the second body 26, the second body 26 may be affixed to the third body using the hinge lock 46. In the illustrated implementation, when the hinge lock 46 is not engaged, and the third body 44 is rotated away from the second body 26, the screens of the third electronic apparatus 42 and the second electronic apparatus 16 are side by side.

Figure 6:
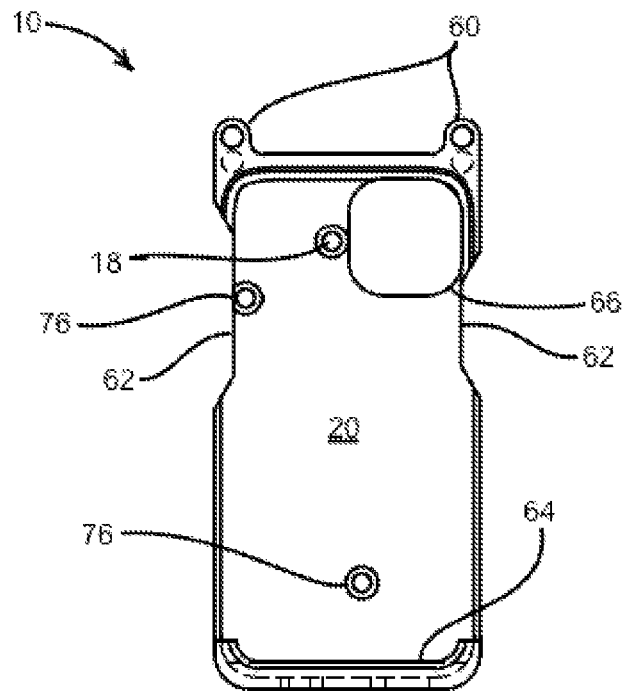
FIG. 6 illustrates a plan view of the first body of the first and second embodiment phone rig for multiple cameras.

Referring to FIG. 6, the first body 20 is shown in plan view. The first body 20 includes a wedge screw portal 18 positioned for affixing the first body 20 to the wedge mount 38 (in the case of the first implementation). The first body 20 also includes body screw portals 76 for anchoring the first body 20 to the second body 26, including through the wedge mount 38 as illustrated (in the case of the first and second implementation). Two top clamp anchorages 60 are positioned at the top of the first body 20 for affixing the top clamp 22 to the first body 20 to retain the top of the first electronic apparatus 12. A bottom anchor 64 is located at the bottom of the first body 20, for retaining the bottom of the first electronic apparatus 12. A camera depression 66 is provided near the top of the first body 20 at the location of the camera or cameras (not shown) of the first electronic apparatus 12.

Figures 7A, 7B:
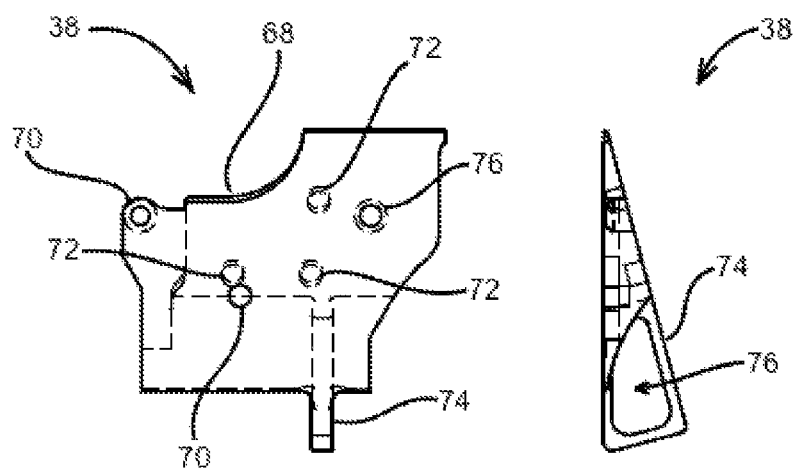
FIG. 7A illustrates a plan view of a wedge component of the first and second embodiment phone rig for multiple cameras.
FIG. 7B illustrates an elevation view of a wedge component of the first and second embodiment phone rig for multiple cameras

Referring to FIGS. 7A and 7B, the wedge mount 38 is shown in plan view and elevation view, respectively. The wedge mount 38 includes a camera cut out 68 shaped and positioned to allow space for the first moment mount 28. A pair of first body mounting points 70 are provided for anchoring the wedge mount 38 to the first body 20. A series of second body mounting points 72 are provided for anchoring the wedge mount 38 to the second body 26. The wedge mount 38 includes a body screw portal 76, for affixing the first body 20 to the second body 26 through the wedge mount 38. A handle 74 is provided, and preferably includes a handle portal 76 for ease of manipulation when installing the wedge mount 38 on the first body 20 and the second body 26.

Figure 8:
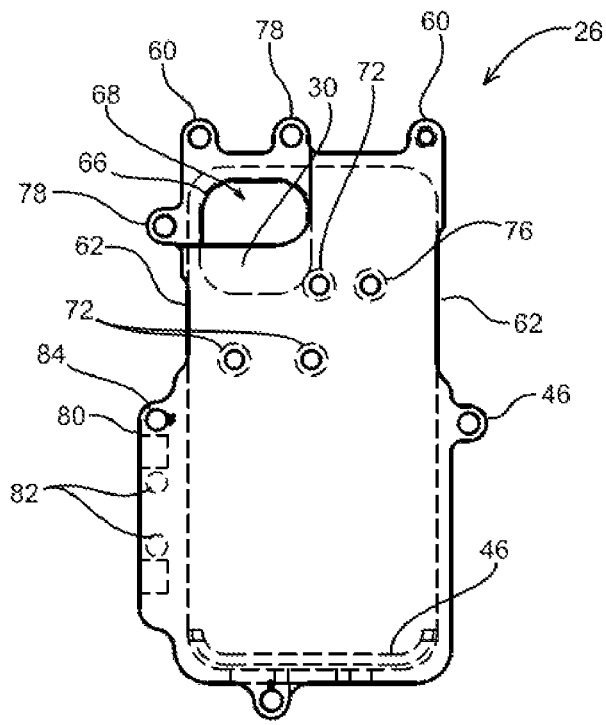
FIG. 8 illustrates a second body of the first and second implementations phone rig for multiple cameras.

Referring to FIG. 8, the second body 26 is shown in plan view. The second body 26 includes second body mounting points 72, and a body screw portal 76. Similar to the first body 20, the second body 26 also includes access slots 62 for manipulating controls on the second electronic apparatus 16. Also similar to the first body 20, the second body 26 includes top clamp anchorages 60 for affixing a top clamp 22, and a bottom anchor 46, for holding the second electronic apparatus.

The second body 26 includes moment mount anchorages 78 for affixing the first moment mount 28 to the second body 26. To allow access between the first moment lens 32 and the camera or cameras (not shown) of the second electronic apparatus 16, the second body includes a camera cut-out 68 within the camera depression 66. The second body 26 preferably also includes a hinge tab 80 including two first hinge fixing points 82 for attaching the hinge 58 to the second body 26. A lid attachment 84 is included for anchoring the lid 34 to the second body 26 opposite the hinge lock 46.

Referring to FIG. 9, the third body 44 is shown in plan view. Similar to the first body 20 and the second body 26, the third body includes top clamp anchorages 60 for affixing a top clamp 22, and a bottom anchor 64 for securely holding the third electronic apparatus 42 in the third body 44. A hinge lock 46 is provided, which preferably overlaps the hinge lock 46 on the second body 26. Also similar to the second body 26, the third body 44 includes moment mount anchorages 78 for affixing the second moment mount 48 which supports the second moment lens 50. A camera cut out 68 is provided in the camera depression 66 in the third body 44, similar to the second body 26. The third body 44 also includes hinge tabs 86 that affix to the hinge 58, thereby enabling the third body 44 (and thus the third electronic apparatus 42) to rotate relative to the second body 26 (and thus the second electronic apparatus 16).

The foregoing descriptions of implementations of the present disclosure have been presented only for purposes of illustration and description. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A phone rig for holding a first electronic apparatus having a first screen, and a second electronic apparatus having a second screen and a first camera, the phone rig comprising:

a first body configured for holding the first electronic apparatus therein, in a screen facing orientation;

a second body configured with a camera portal facing the same direction as the first screen;

the first body configured for fixation to the second body in a diagonally offset configuration, such that the first screen does not cover the camera portal; and wherein the second body is configured for supporting a first moment lens installed over the first camera of the second electronic apparatus, the first moment lens adjacent the first screen.

2. The phone rig of claim 1 further comprising a cover for entirely covering the second body.

3. The phone rig of claim 1 further comprising a wedge member, the wedge member configured for installation between the first body and the second body, such that the first second body is angled away from the first camera.

4. The phone rig of claim 1 further comprising a first moment mount configured for fixing to the second body and the first moment lens.

5. The phone rig of claim 1 wherein the first body includes a first bottom anchor for holding the first electronic apparatus.

6. The phone rig of claim 1 further comprising a first top clamp for fixing the first electronic apparatus in the first body.

7. The phone rig of claim 1 wherein the second body includes a bottom anchor.

8. The phone rig of claim 1 further comprising a second top clamp on the second body.

9. The phone rig of claim 1, wherein the first body and the second body each have cut-outs.

10. The phone rig of claim 1 further comprising a third body, the third body configured for affixing to the second body on an opposite side of the first body.

11. The phone rig of claim 10 further comprising a wedge member, the wedge member configured for installation between the first body and the second body, such that the first screen of the first electronic apparatus is angled, relative to the third body.

12. The phone rig of claim 10 wherein the third body is configured for supporting a second moment lens.

13. The phone rig of claim 12 further comprising a second moment mount for holding the second moment lens in place over the second body.

14. The phone rig of claim 10 wherein the third body comprises a third bottom anchor.

15. The phone rig of claim 10 further comprising a third top clamp.

16. The phone rig of claim 10 further comprising a hinge between the second body and the third body, the hinge offset from the first body.

17. The phone rig of claim 16 wherein the hinge is configured along a side of the second body and a side of the third body, such that the second body and the third body are aligned.

18. The phone rig of claim 16 further comprising a hinge lock, for locking the third body against the second body.

19. A phone rig for holding a first electronic apparatus having a first screen and a second electronic apparatus having a second screen and a first camera, and a third electronic apparatus having a third screen and a second camera, the phone rig comprising:

a first body configured for holding the first electronic apparatus therein, in a screen facing orientation;

a second body configured with a camera portal in the screen facing orientation;

a third body configured for attaching to the second body;

the first body configured for fixation to the second body in a diagonally offset configuration, such that a first screen of the first electronic apparatus and the camera portal of the second electronic apparatus are both visible from a viewing direction;

the third body configured for fixation to the second body, such that a camera portal of the third electronic apparatus faces away from the viewing direction, wherein the second body is configured for supporting a first moment lens; and wherein the third body is configured for supporting a second moment lens offset from the first moment lens.

20. The phone rig of claim 19 further comprising a wedge member, the wedge member configured for installation between the first body and the second body, such that the first screen of the first electronic apparatus is angled, relative to the second body and the third body.

* * * * *